(12) United States Patent
Nalawadi et al.

(10) Patent No.: US 6,694,401 B2
(45) Date of Patent: Feb. 17, 2004

(54) METHOD AND APPARATUS FOR EXECUTING REAL-MODE INTERRUPTS FROM WITHIN EXTENDED SMRAM HANDLER

(75) Inventors: Rajeev K. Nalawadi, Folsom, CA (US); Dong H. Thai, Elk Grove, CA (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 10/033,414

(22) Filed: Dec. 28, 2001

(65) Prior Publication Data

US 2003/0126349 A1 Jul. 3, 2003

(51) Int. Cl.[7] .............................................. G06F 13/00
(52) U.S. Cl. ........................... 711/2; 711/100; 711/154; 710/48
(58) Field of Search ........................... 711/2, 100, 154; 710/48, 260; 712/229

(56) References Cited

U.S. PATENT DOCUMENTS

| | | | | |
|---|---|---|---|---|
| 5,274,834 A | * | 12/1993 | Kardach et al. | 710/260 |
| 5,339,437 A | * | 8/1994 | Yuen | 710/261 |
| 5,706,407 A | * | 1/1998 | Nakamura et al. | 700/251 |
| 5,978,903 A | * | 11/1999 | Quimby et al. | 712/229 |
| 5,978,912 A | * | 11/1999 | Rakavy et al. | 713/2 |

* cited by examiner

Primary Examiner—Tuan V. Thai
(74) Attorney, Agent, or Firm—Sharon Wong

(57) ABSTRACT

Embodiments of the present invention provide for executing real-mode interrupts from within an extended SMRAM handler. If there is a need to make a real-mode call from the extended SMRAM handler, control is transferred to a compatible SMRAM region and appropriate calls to the real-mode calls are executed from within the compatible SMRAM region. The call from the extended SMRAM handler code to the compatible SMRAM code switches the processor from protected mode to real-mode. After the real-mode call is complete, control is returned to the compatible SMRAM handler. The processor is placed back into protected mode and control transferred back to the extended SMRAM handler code.

23 Claims, 5 Drawing Sheets

200

METHOD AND APPARATUS FOR EXECUTING REAL-MODE INTERRUPTS FROM WITHIN EXTENDED SMRAM HANDLER

BACKGROUND

1. Field

The present invention relates generally to computer systems and more particularly microprocessor based computer systems.

2. Background Information

System management mode (SMM) allows systems developers to provide low-level functions, such as power management or security, in a manner that is transparent to operating systems and application programs. SMM allows operating system and application software operation to be interrupted to perform these low level functions. After performing the low level function, the operating system or application software operation is resumed from the point that it was interrupted.

In order to initiate a low level function, a hardware interrupt, referred to herein as the System Management Interrupt (SMI), is generated. When an SMI is received, the processor waits for all pending writes to complete. The processor also waits for writes pending on external devices, such as external caches. Once all pending writes are completed, the processor then saves some of its current execution state to System Management Random Access Memory (SMRAM) and begins execution of the SMM handler, a software routine that performs low level functions, such as error reporting and logging, I/O emulation, suspend or resume operation, and power management.

SMRAM is memory that is reserved for SMM. The SMM handler is stored in SMRAM. Before execution of the SMM handler, the processor automatically stores some of its current execution state in a reserved portion of SMRAM. For example, the processor often stores the state of its segmentation registers, general-purpose registers, instruction pointer, descriptor table registers, and model specific registers in the reserved portion of the SMRAM. Some register state, such as the floating-point registers, may not be automatically stored upon entry to SMM since many SMM handlers do not modify these registers. However, if these registers are used in an SMM handler, code to store and restore these registers may be included in the SMM handler routine.

SMM handler codes for platforms are written using a compatible SMRAM region that typically resides below one-megabyte of memory. The compatible SMRAM region and video memory share use of A-B memory segments. Due to sharing of A-B memory segments between two different agents dependent on executing in SMM mode, the compatible SMRAM typically runs in an un-cached environment. Due to the latency of code execution being large in an un-cached environment, the SMM handler code is migrated to another memory region to take advantage of the cached environment that is provided through an extended SMRAM region of system memory.

SMM software can run in two modes—below one-megabyte and above one-megabyte. The SMRAM region that resides below one-megabyte is commonly referred to as "Compatible" SMRAM and the SMRAM region that resides above one-megabyte is commonly referred to as "Extended" SMRAM. Because the extended SMRAM handler executes above the one-megabyte boundary, code within the extended SMRAM handler executes in protected mode. However, it is typically easier to invoke real-mode interrupts when executing a compatible SMRAM handler that runs below one-megabyte. In particular, SMM handlers usually require execution ability below the one-megabyte memory boundary in order to execute system BIOS calls (e.g., plug-and-play, APM, INT13h power-down/power-up hard drives) and graphics BIOS calls (e.g., monitor ON/OFF calls, panel blanking, CRT rotations, graphics suspend save/restore, etc.).

What is needed therefore is a method and apparatus for executing real-mode interrupts in an extended SMRAM environment.

DETAILED DESCRIPTION

In the following description, numerous specific details are set forth such as specific memory configurations, address ranges, protection schemes, etc., in order to provide a more thorough understanding of the present invention. It will be apparent, however, to one skilled in the art, that the present invention may be practiced without these specific details. In other instances, well known apparatus and process steps have not been described in detail in order to avoid obscuring the invention.

Embodiments of the present invention provide for executing real-mode interrupts from within an extended system management random access memory (SMRAM) handler. When running in extended SMRAM, system management interrupts (SMIs) are controlled in an extended SMRAM segment that is typically located at the top of memory. In particular, a SMI causes a processor to execute at a default system management mode (SMM) base address. The processor is assigned a unique SMM relocation base address that points to a memory region within an extended SMRAM handler. Another SMI allows the processor to execute from the extended SMRAM handler. The processor is switched to protected mode after entering the extended SMRAM handler. The extended SMRAM handler execution continues with processing of different SMI events. If there is a need to make a below one-megabyte real-mode call from the extended SMRAM handler, control is transferred to a compatible SMRAM region and appropriate calls to the below one-megabyte real-mode calls are executed from within the compatible SMRAM region. The call from the extended SMRAM handler code to the compatible SMRAM code switches the processor from protected mode to real-mode. After the below one-megabyte real-mode calls complete, control is returned to the compatible SMRAM handler. The processor is placed back into protected mode and control transferred back to the extended SMRAM handler code.

Computer System

Figure 1:
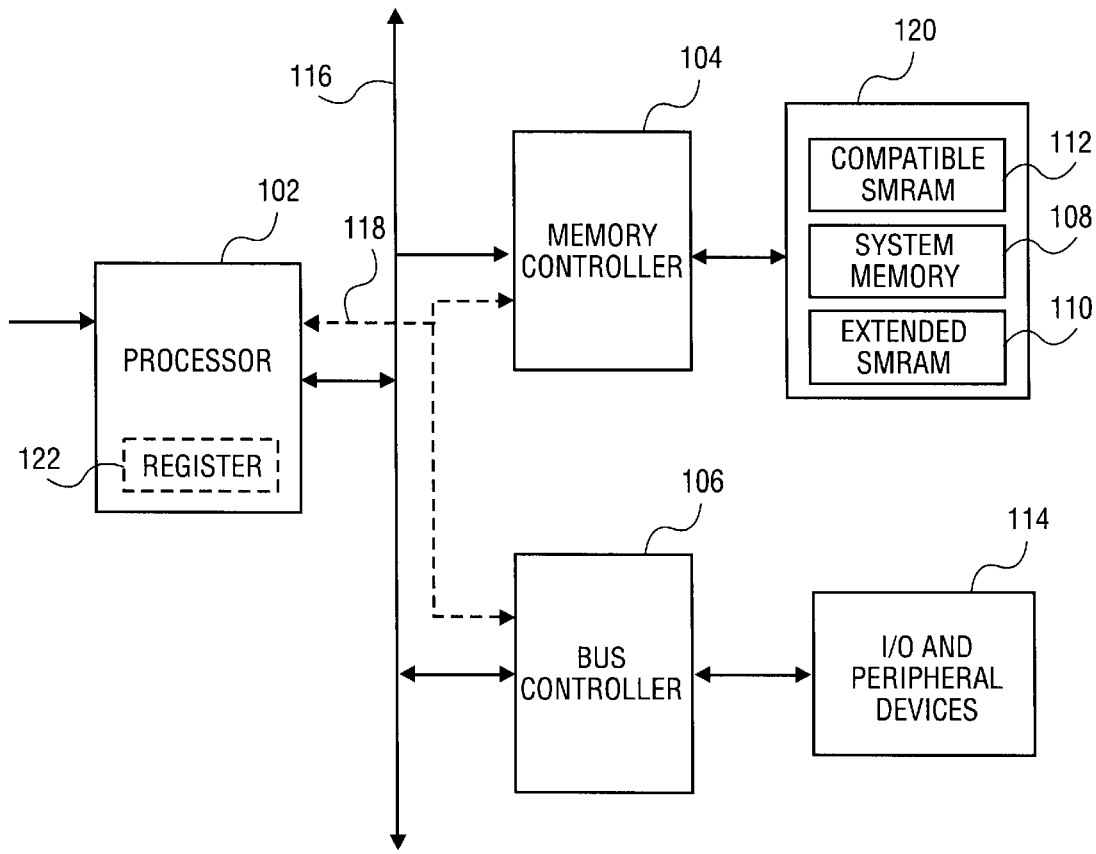
FIG. 1 illustrates a functional block diagram of an embodiment of an exemplary computer system embodying the present invention.

FIG. 1 illustrates an exemplary computer system 100 that implements an embodiment of the present invention. Embodiments of the present invention can be implemented in any processor-based system which employs any microprocessor that provides the use of a SMM, which is an operating mode that is used to implement power management and other enhanced system functions in firmware in a manner that is transparent to the operating system and applications software. The computer system 100 may be implemented as a desktop computer, a notebook computer or a server.

Computer system 100 includes processor 102, memory controller 104, bus controller 106, memory 120 and various I/O and peripheral devices 114. In one embodiment, processor 102 is the Intel P4 microprocessor by Intel Corporation although one skilled in the art will recognize that the present invention may be implemented with other CPUs as well. Processor 102 is coupled via system address bus 116 and control line 118 to memory controller 104 and bus controller 106. Memory controller 104 is coupled to memory 120 that as illustrated in FIG. 2 includes system memory 108, extended SRAM 110 and compatible SMRAM 112.

Memory controller 104 provides memory address and memory control signals to system memory 108 and SMRAM 110 to enable data transfers between system memory 108 or SMRAM 110 and processor 102 via system bus 116. Processor 102 is also coupled via system bus 116 and CPU control line 118 to bus controller 106, which is in turn coupled to various I/O and peripheral devices 114. Memory controller 104 and other system logic are typically integrated into a chipset to provide power management BIOS services.

Figure 2:
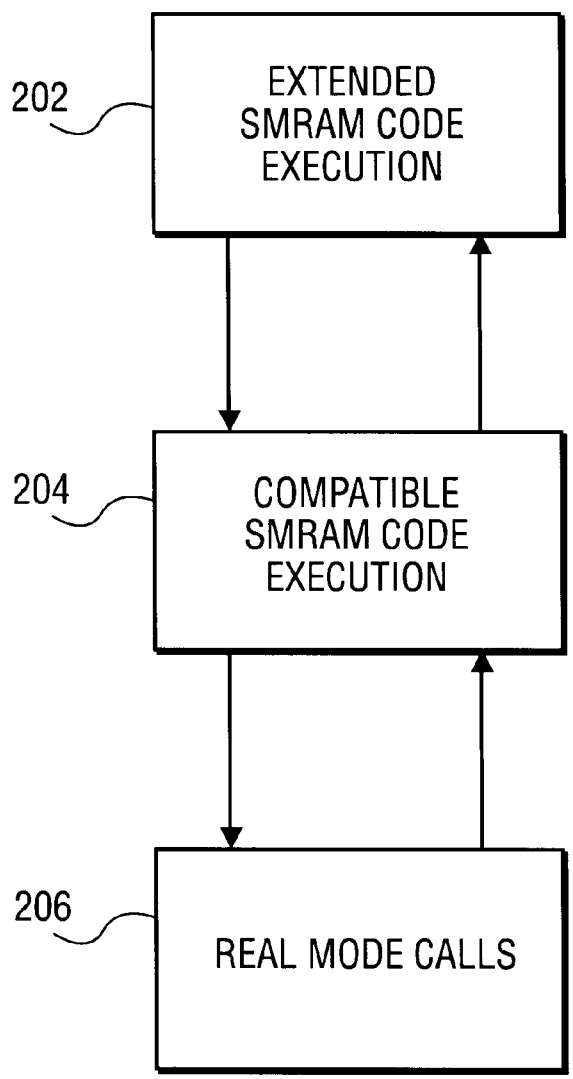
FIG. 2 illustrates a flow diagram of an embodiment of a process for executing real-mode interrupts from within an extended SMRAM handler.

Referring to FIG. 2, a flow diagram of an embodiment 200 of a process for executing real-mode interrupts from within an extended SMRAM handler is illustrated. As shown in FIGS. 1 and 2, SMM is invoked by generating a SMI signal to processor 102. Processor 102, in response, asserts the SMI control signal that accesses extended SMRAM 110. Extended SMRAM 110 is a memory space dedicated and secured for use in SMM—i.e. the operating system and applications software do not have access to this space. The current processor state (i.e. context) is stored in extended SMRAM 110 after assertion of the SMI signal and processor 102 then jumps to a location in extended SMRAM 110 to execute the extended SMI handler code for performing the system management activities (step 202). Upon completion of the system management activities, the extended SMI handler executes a resume (RSM) instruction that restores processor's 102 context from extended SMRAM 110, de-asserts the SMI signal, and then returns control to the previously interrupted operating system or application program execution.

If there is a need to make a below one-megabyte real-mode call from the extended SMI handler, control is transferred to the compatible SMRAM region 112 and the compatible SMRAM code is executed (step 204). The appropriate calls to the below one-megabyte real-mode calls are executed from within the compatible SMRAM region (step 206). After the below one-megabyte real-mode calls complete, control is transferred back to the compatible SMRAM code (step 204). The call from the extended SMRAM handler code to the compatible SMRAM handler code switches processor 102 from protected mode to real-mode. Processor 102 is placed back into protected mode to enable the transfer of control back to the extended SMRAM handler code (step 202).

Figure 3:
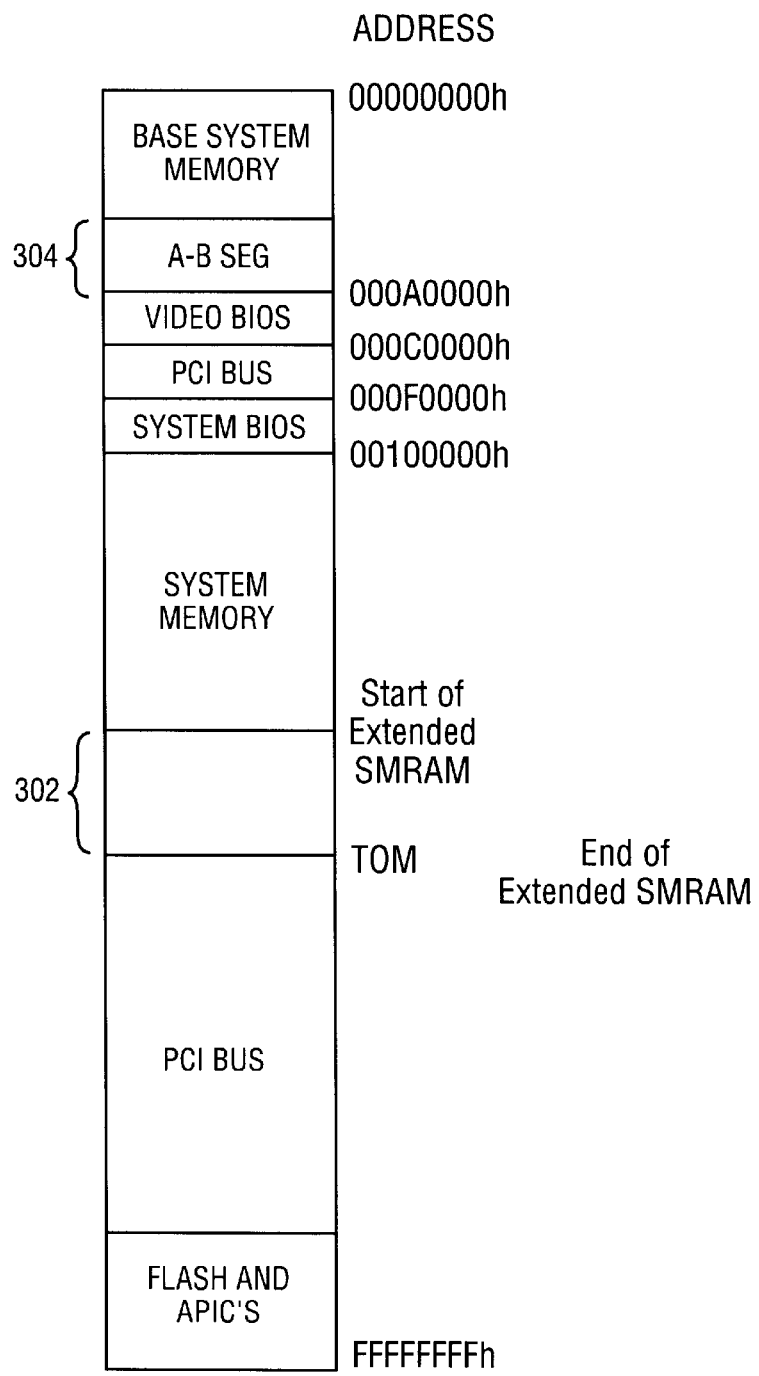
FIG. 3 illustrates a block diagram of an embodiment of an exemplary system memory map showing extended SMRAM and compatible SMRAM usage.

FIG. 3 illustrates a block diagram of an embodiment of an exemplary system memory map 300 showing extended SMRAM 302 and compatible SMRAM 304 usage for the computer system 100 of FIG. 1. System addresses 0h–9FFFFh map to base system memory. System addresses A0000h-BFFFFh map to A-B segment memory. The A-B memory segment is typically 128K with 64K comprising each segment. The compatible SMRAM region and video memory typically share use of A-B memory segments. Due to sharing of A-B memory segments between two different agents that is dependent on executing in SMM mode versus normal mode, the compatible SMRAM typically runs in an un-cached environment. System addresses C0000h-CFFFFh map to video BIOS code. System addresses D0000h–EFFFFh map to the PCI bus. System addresses F0000h–FFFFFh map to system BIOS code. System addresses 100000h (one megabyte) and beyond are mapped to system memory (for application use), extended SMRAM 202, PCI bus, flash and APICs.

Processor 102 is configured to automatically map the extended SMRAM code and data from physical memory to a portion of processor's address space that is above one megabyte. Because the extended SMRAM handler executes above the one-megabyte boundary, code within the extended SMRAM handler executes in protected mode. The extended SMRAM typically advantageously runs in a cached environment while in contrast the compatible SMRAM typically runs in an un-cached environment.

Figure 4A:
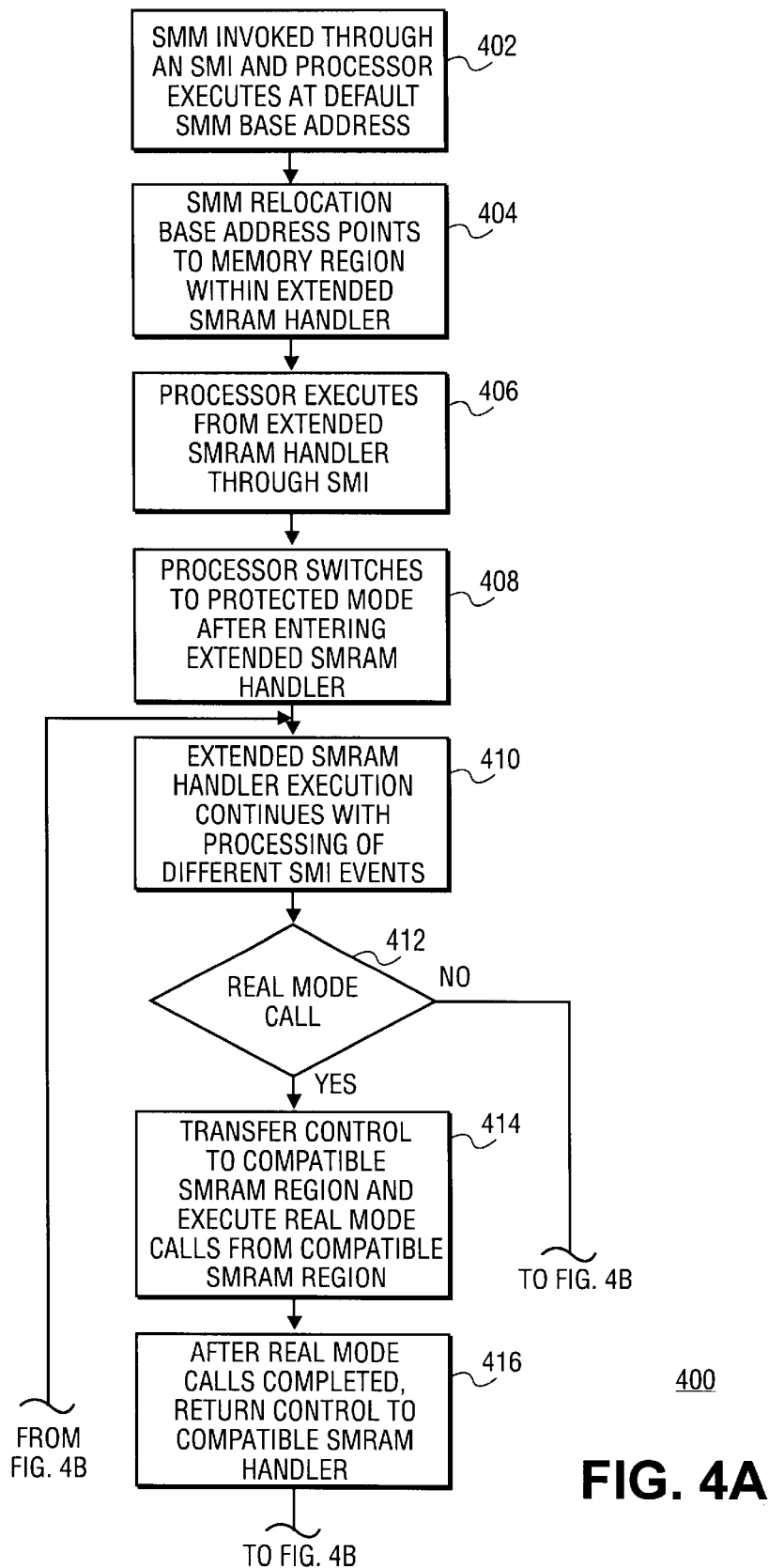
FIGS. 4A and 4B illustrate a detailed flow diagram of an embodiment of a process as shown in FIG. 3 for executing real-mode interrupts from within an extended SMRAM handler.
Figure 4B:
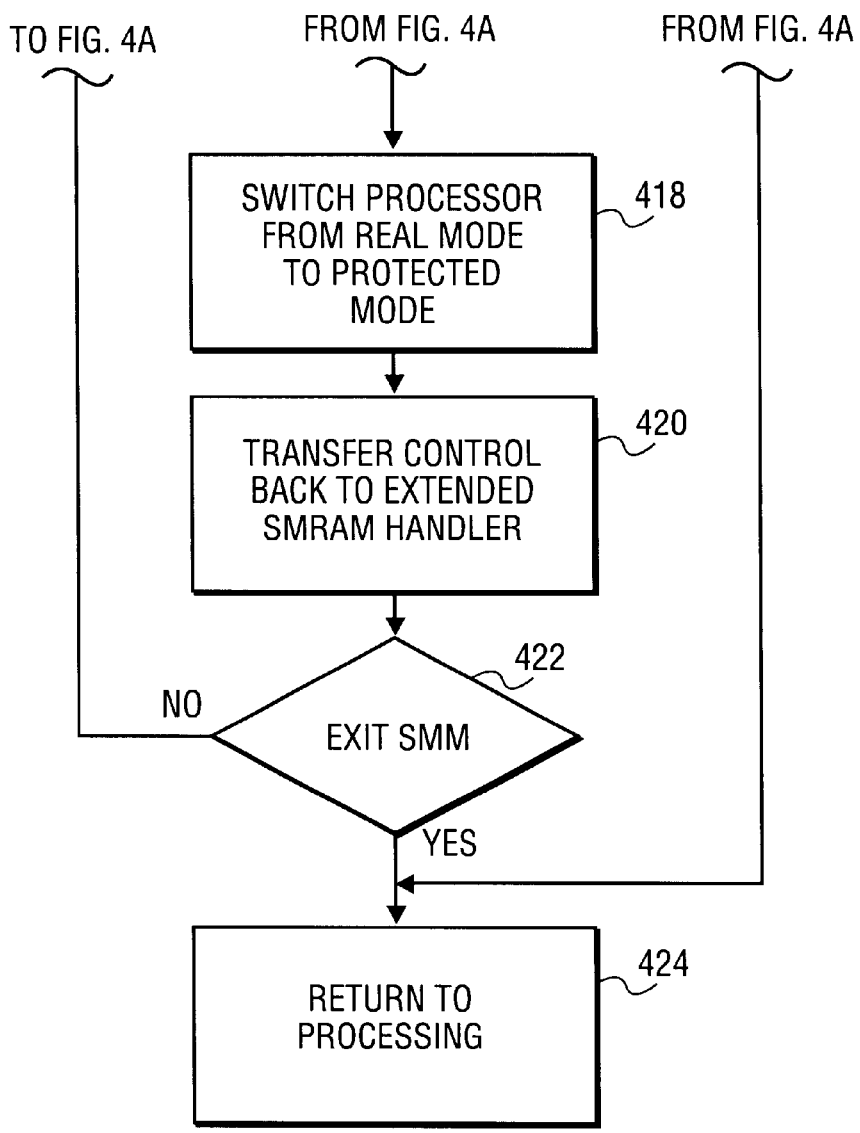

FIGS. 4A and 4B illustrate a detailed flow diagram of an embodiment of a process for executing real-mode interrupts from within an extended SMRAM handler. A SMM mode is provided to the computer system. Debugging and various other system management functions are performed under SMM. A particular example of other SMM functions is system management. A SMI is provided to put the computer system into SMM. The SMI is a non-maskable interrupt having higher priority than other interrupts, including other non-maskable interrupts.

SMM is invoked by generating a SMI via assertion of the SMI signal to processor 102. For example, a SMI generation from the chipset/APIC bus message forces processor(s) to execute at a default SMI base address (step 402). The SMI can be a discrete signal or generated through an APIC bus message. The SMI signal asserts the SMI and enters the system management mode. The SMI signal informs external devices that the computer system is operating in the SMM mode. Processor 102 then prepares to save the current processor state in a multiple-step procedure.

Each processor(s) present in the system gets a unique SMM relocation base address which points to the memory region within the extended SMRAM handler (step 404). For example, in the embodiment where there are four processors in the system, each will be assigned different base addresses and SMM handler codes. In the SMM mode, the processor has access to any address within the extended SMRAM region. Thus the unique SMM relocation base address defines an SMM memory range and the system begins saving the processor state in the manner of a stack save, starting at the top of the extended SMRAM memory and moving downward through memory address of the memory. In the save processor state, the processor writes the internal register contents of the processor to the SMRAM memory starting at the relocation base address and proceeding downward in memory in a stack-like fashion.

In particular, processor 102 pre-defines the range of addresses within extended SMRAM 110 that are used to save the CPU's 14 state (or context) when entering SMM. Processor 102 also specifies the entry point of the SMI code. These locations are relative to the base address of the extended SMRAM 110. In one embodiment, the base address of extended SMRAM 110 is set by processor 102 to a default value. Processor 102 defines a byte region of extended SMRAM for saving the CPU's 14 context. Once the CPU's 14 context is saved, processor 102 jumps to the entry point of the SMI handler at SMM location. The SMI handler then executes its routine within extended SMRAM, using it to store data and stacks as required.

Another SMI allows the processor(s) to execute from an extended SMRAM handler (step 406). The extended SMRAM handler performs system management operations. The extended SMRAM handler is then configured to begin execution of SMI code with processor 102 in the SMM mode.

The processor(s) is switched to protected mode after entering the extended SMRAM handler (step 408). In particular, after, the processor starts executing the SMRAM code, it will immediately be switched to protected mode by the SMRAM code in response to the SMI. The extended SMRAM handler issues a control signal to processor 102 to configure processor 102 to operate in the protected mode. In one embodiment, this is accomplished by setting a bit in a control register.

Once configured, the extended SMRAM handler execution continues with processing of the different SMI events (step 410).

If there is a need to make a below one-megabyte real-mode call from the extended SMRAM handler (step 412), control is transferred to the compatible SMRAM handler and then the appropriate calls to the below one-megabyte real-mode calls are executed from within the compatible SMRAM region (i.e. A-B memory region) (step 414). If there is a need to make a real mode call, a jump is made to the A-B segment and from the compatible SMRAM, video bios, system bios run time calls as well as other calls are made. The processor 102 is configured to operate in real mode.

When this transfer occurs, the contents of nearly all of the registers used with the previous process are saved, especially the contents of one or more flags and registers that contain the results of operations already underway. Processor includes registers, flags and pointers for status and control purposes. A control register holds system control flags that control the modes of operation or indicate states that apply to processor 102.

Referring to FIG. 1, processor 102 is in communication with extended flags (EFLAGS) register 122 that holds important information of interrupt flag, carry flag, sign flag, parity flag, I/O privilege level flags and various other flag bits used by the SMM handler for decision making. The contents of extended flags register 122 in processor 102 is readable across the processor transitions from protected mode to real-mode and vice versa. The stack is setup in the compatible SMRAM for generic usage by the caller prior to invocation of the real-mode call. This stack is also used as a real-mode call data area for transferring information between the protected mode and real-mode transitions. In all the instances, after invocation and return of the real-mode call, the results are passed back to the caller by using extended flags register 122 contents. In one instantiation and invocation of a real-mode call, the "carry flag" being set may indicate that the call was unsuccessful. The caller after returning to extended SMRAM and protected mode can make a decision based on the contents of extended flags register 122. Extended flags register information is transferred between the protected-mode and real-mode by using the stack setup in the compatible SMRAM.

Referring back to FIG. 4, in one embodiment, in order to switch to the real mode, the real mode bit of a control register must be set. Once in real mode, processor 102 determines the logical address of the application. The physical address is determined by using page tables. The extended SMI handler then begins to perform the task required to process the system management activities. The processor 102 forms the real mode addresses and runs the application program that is the real task. Flags are preserved and the processor 102 is subsequently returned to the protected mode.

After all the real mode calls have been completed, control is then returned to the compatible SMRAM handler (step 416).

The processor is then placed back into protected mode from real mode (step 418) to enable the transfer of control back to the extended SMRAM handler code (step 420). In particular, upon completion of the real mode calls, the compatible SMRAM handler configures processor 102 to exit the real mode, which also configures processor 102 to operate in the protected mode again. The compatible SMRAM handler then executes a resume instruction that restores processor's context in compatible SMRAM 110, de-asserts the compatible SMI signal, places processor 102 back into protected mode and returns control to the extended SMRAM handler.

It is then determined if all system management activities have been completed (step 422). If not, system management activities continue to be processed (steps 410–420). If all system management activities have been completed, the extended SMRAM handler configures processor 102 to exit protected mode. Control is then returned to the previously interrupted operating system process or application program execution (step 424).

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A computer system comprising:

a processor;

a memory coupled to the processor including a first memory address space and a second memory address space;

an interface coupled to the memory to access the first memory address space when the processor is operating in a first mode and to access the second memory address space when the processor is operating in a second mode;

a request line coupled to the interface, the request line designating a signal requesting operation of the processor in the second mode when there is a need to make a real-mode call during operation in the first mode; and logic to transfer operation of the processor to the second mode to make the real-mode call and transfer operation of the processor back to the first mode after the real-mode call is executed.

2. The computer system of claim 1 wherein the first memory address space is configured in a system random access memory residing above a boundary.

3. The computer system of claim 1 wherein the first memory address space is configured in a system random access memory residing above one megabyte.

4. The computer system of claim 1 wherein the first memory address space comprises an extended system random access memory space.

5. The computer system of claim 1 wherein the first memory address space is configured in a system random access memory residing below a boundary.

6. The computer system of claim 1 wherein the first memory address space is configured in a system random access memory residing below one megabyte.

7. The computer system of claim 1 wherein the first memory address space comprises a compatible extended system random access memory space.

8. A method for executing real-mode interrupts from within an extended SMRAM handler comprising:

configuring a memory to include a first memory address space and second memory address space, the first memory address space having a extended SMRAM memory range in an upper memory block region of a system memory and the first memory address being accessed when the processor is operating in an extended SMRAM mode, and the second memory address space having compatible SMRAM memory range in an lower memory block region of the system memory and the second memory address being accessed when the processor is operating in a compatible SMRAM mode;

directing memory accesses to the first memory address space while operating in the extended SMM mode;

receiving a signal designating a request to operate the processor in the compatible SMRAM mode when a real-mode call is requested;

initiating processor operations in the compatible SMRAM mode to execute the real-mode call; and restoring memory configuration to direct memory accesses to the first memory address space.

9. The method of claim 8 further comprising:

receiving a signal designating a request to terminate operations of the processor in the compatible SMRAM mode; and restoring memory configuration to direct memory accesses to the first memory address space.

10. The method of claim 8 wherein the first memory address space is configured in a system random access memory residing above a boundary.

11. The method of claim 8 wherein the first memory address space is configured in a system random access memory residing above one megabyte.

12. The method of claim 8 wherein the first memory address space comprises an extended system random access memory space.

13. The method of claim 8 wherein the first memory address space is configured in a system random access memory residing below a boundary.

14. The method of claim 8 wherein the first memory address space is configured in a system random access memory residing below one megabyte.

15. The method of claim 8 wherein the first memory address space comprises a compatible extended system random access memory space.

16. A machine readable medium having stored therein a plurality of machine readable instructions executable by a processor to execute real-mode interrupts from within an extended SMRAM handler comprising:

instructions to configure a memory to include a first memory address space and second memory address space, the first memory address space having a extended SMRAM memory range in an upper memory block region of a system memory and the first memory address being accessed when the processor is operating in an extended SMRAM mode, and the second memory address space having compatible SMRAM memory range in an lower memory block region of the system memory and the second memory address being accessed when the processor is operating in a compatible SMRAM mode;

instructions to direct memory accesses to the first memory address space while operating in the extended SMM mode;

instructions to receive a signal designating a request to operate the processor in the compatible SMRAM mode when a real-mode call is requested;

instructions to initiate processor operations in the compatible SMRAM mode to execute the real-mode call; and instructions to restore memory configuration to direct memory accesses to the first memory address space.

17. The machine readable medium of claim 16 further comprising:

instructions to receive a signal designating a request to terminate operations of the processor in the compatible SMRAM mode; and instructions to restore memory configuration to direct memory accesses to the first memory address space.

18. The machine readable medium of claim 16 wherein the first memory address space is configured in a system random access memory residing above a boundary.

19. The machine readable medium of claim 16 wherein the first memory address space is configured in a system random access memory residing above one megabyte.

20. The machine readable medium of claim 16 wherein the first memory address space comprises an extended system random access memory space.

21. The machine readable medium of claim 16 wherein the first memory address space is configured in a system random access memory residing below a boundary.

22. The machine readable medium of claim 16 wherein the first memory address space is configured in a system random access memory residing below one megabyte.

23. The machine readable medium of claim 16 wherein the first memory address space comprises a compatible extended system random access memory space.

* * * * *